United States Patent
Yedluri et al.

(10) Patent No.: US 12,381,883 B2
(45) Date of Patent: Aug. 5, 2025

(54) HIERARCHICAL BASED DECRYPTION FOR IMPROVED CONTENT SECURITY

(71) Applicant: Bank of America Corporation, Charlotte, NC (US)

(72) Inventors: Praveen Yedluri, Hyderabad (IN); Vittal Surya Narayana Goli, Hyderabad (IN); Saurabh Kumar, Haryana (IN); Swati Pandey, Hyderabad (IN); Vishal Prasad Gupta, Hyderabad (IN); Ashisa Kumar Nayak, Miyapur (IN)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 18/103,779

(22) Filed: Jan. 31, 2023

(65) Prior Publication Data
US 2024/0259385 A1 Aug. 1, 2024

(51) Int. Cl.
*H04L 9/40* (2022.01)
*H04L 9/08* (2006.01)
*H04L 67/306* (2022.01)

(52) U.S. Cl.
CPC .......... *H04L 63/105* (2013.01); *H04L 9/083* (2013.01); *H04L 9/08* (2013.01); *H04L 63/0428* (2013.01); *H04L 67/306* (2013.01)

(58) Field of Classification Search
CPC ... H04L 63/105; H04L 63/0428; H04L 9/083; H04L 9/08; H04L 67/306
See application file for complete search history.

(56) References Cited

U.S. PATENT DOCUMENTS

| | | | |
|---|---|---|---|
| 9,608,810 B1 * | 3/2017 | Ghetti | H04L 63/0428 |
| 9,679,118 B2 | 6/2017 | Sitrick et al. | |
| 10,044,509 B1 * | 8/2018 | Kirshner | H04L 63/045 |
| 11,392,714 B1 | 7/2022 | Matthews et al. | |
| 2004/0103202 A1 * | 5/2004 | Hildebrand | H04L 63/20 709/229 |
| 2004/0143732 A1 | 7/2004 | Choi et al. | |
| 2008/0013722 A1 | 1/2008 | Gentry et al. | |
| 2010/0246827 A1 | 9/2010 | Lauter et al. | |
| 2012/0269340 A1 | 10/2012 | Stu et al. | |
| 2017/0111172 A1 | 4/2017 | Sprenger | |
| 2017/0178126 A1 | 6/2017 | Liu et al. | |
| 2017/0250796 A1 | 8/2017 | Samid | |

(Continued)

*Primary Examiner* — Ellen Tran
(74) *Attorney, Agent, or Firm* — Banner & Witcoff, Ltd.

(57) ABSTRACT

Aspects of the disclosure relate to hierarchical based decryption. A computing platform may receive, from a first user, a request to encrypt a file. The computing platform may generate, for the file, a symmetric key. The computing platform may encrypt, using the symmetric key, the file. The computing platform may receive, from a second user, a request to decrypt the encrypted file. The computing platform may identify a classification of the encrypted file, which may be one of: personal, proprietary, or company related. Based on identifying a proprietary classification, the computing platform may obtain an employee hierarchy corresponding to the first user, compare the second user to the employee hierarchy, and based on identifying that the first user is included in the employee hierarchy: decrypt, using the symmetric key, the encrypted file, and grant the second user access to the file.

20 Claims, 14 Drawing Sheets

(56) References Cited

U.S. PATENT DOCUMENTS

| | | |
|---|---|---|
| 2017/0331624 A1 | 11/2017 | Samid |
| 2017/0357816 A1 | 12/2017 | Sharma et al. |
| 2018/0054490 A1 | 2/2018 | Wadhwa et al. |
| 2018/0191692 A1 | 7/2018 | Frank |
| 2019/0363877 A1 | 11/2019 | Figueira |
| 2019/0394179 A1 | 12/2019 | Androulaki et al. |
| 2020/0020224 A1 | 1/2020 | Lashmore et al. |
| 2020/0145189 A1 | 5/2020 | Androulaki et al. |
| 2020/0145203 A1 | 5/2020 | Sun |
| 2021/0176053 A1 | 6/2021 | Santos et al. |
| 2021/0274343 A1 | 9/2021 | Fekih Ahmed et al. |

* cited by examiner

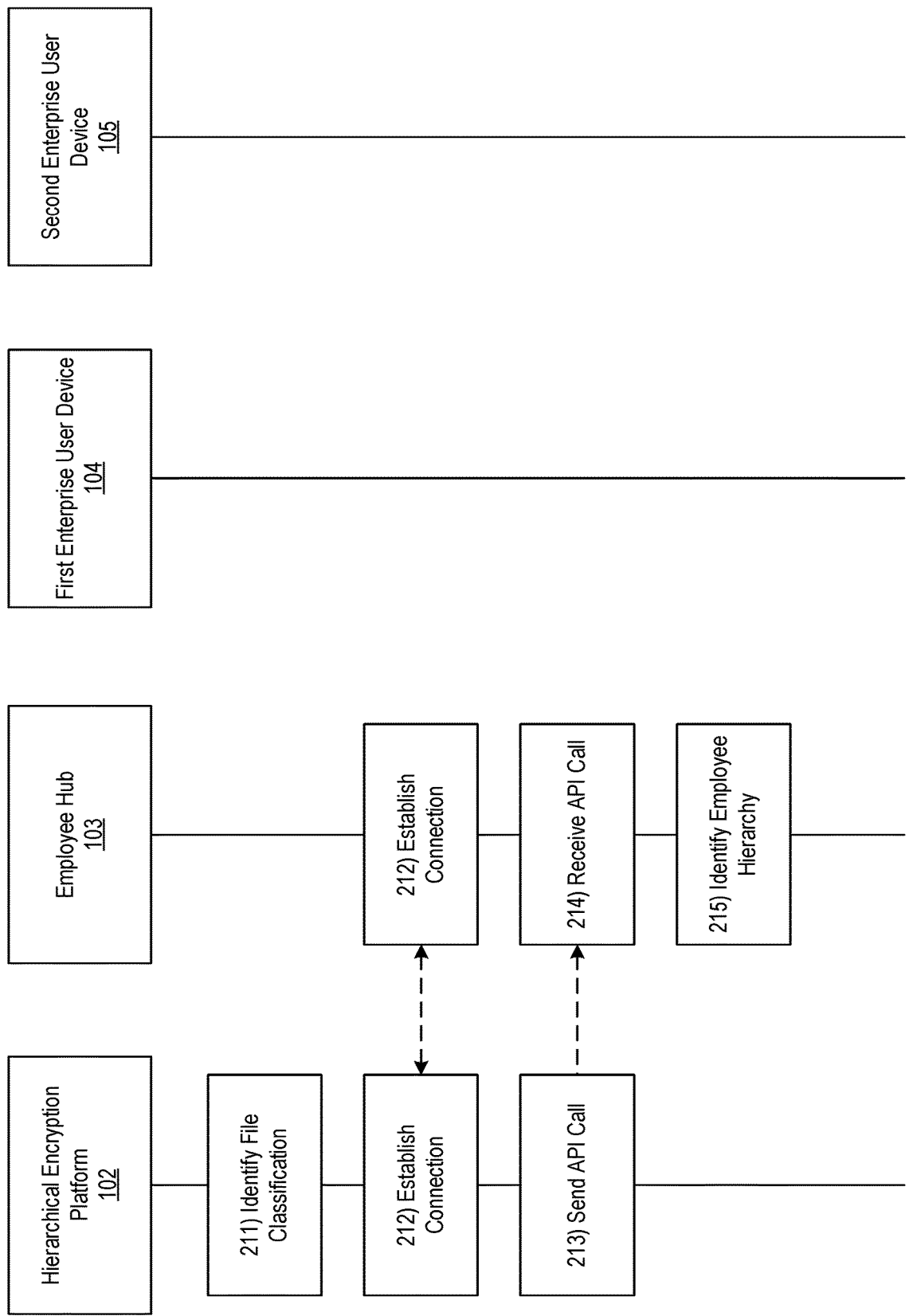

305

Error Interface

You do not have sufficient
authorization to access this file.
Access denied.

**Decryption Approval
Interface**

You have been approved to access
the requested file.

FIG. 4

HIERARCHICAL BASED DECRYPTION FOR IMPROVED CONTENT SECURITY

BACKGROUND

Aspects of the disclosure relate to file encryption/decryption. In some instances, an employee may store sensitive information on their office devices. In some of these instances, this sensitive information may include information that may be proprietary, company related, personal data, and/or other sensitive information. Accordingly, the employee and/or their corresponding organization may cause such sensitive information to be encrypted to avoid misuse. In some instances, however, these files may be configured for decryption/access exclusively by the employee themselves. Thus, in the absence of the employee (e.g., due to retirement, quitting, firing, and/or otherwise), access to the files might not be available (e.g., because no remaining employees of the organization may be able to decrypt the files). This may result in effective data loss on behalf of the organization, which may create inefficiencies. Accordingly, it may be important to develop a method to achieve the security benefits of file encryption without causing file loss in the event of employee absence.

SUMMARY

Aspects of the disclosure provide, effective, efficient, scalable, and convenient technical solutions that address and overcome the technical problems associated with file encryption and decryption techniques. In accordance with one or more illustrative embodiments of the disclosure, a computing platform comprising at least one processor, a communication interface, and memory storing computer-readable instructions may receive, from a first user device of a first user, a request to encrypt a file. The computing platform may generate, for the file, a symmetric key. The computing platform may encrypt, using the symmetric key, the file to produce an encrypted file. The computing platform may receive, from a second user device of a second user, a request to decrypt the encrypted file. The computing platform may identify a classification of the encrypted file. Based on identifying a first classification, the computing platform may: 1) obtain, using a first API call to an employee hub, an employee hierarchy corresponding to the first user, 2) compare the second user to the employee hierarchy, and 3) based on identifying that the first user is included in the employee hierarchy: a) decrypt, using the symmetric key, the encrypted file, and b) grant access, to the second user, to the file.

In one or more examples, based on identifying that the first user is not included in the employee hierarchy, the computing platform may: 1) deny access, to the second user, to the encrypted file, and 2) send, to the second user device, an error notification and one or more commands directing the second user device to display the error notification, which may cause the second user device to display the error notification. In one or more instances, the first classification may be a proprietary classification. In one or more examples, based on identifying a second classification, the computing platform may: 1) obtain, using a second API call to the employee hub, personnel information indicating one or more employees within an authorized department of the company corresponding to the second classification, 2) compare the second user to the personnel information, and 3) based on identifying that the second user is included in the personnel information: a) decrypt, using the symmetric key, the encrypted file, and b) grant access, by the second user, to the file.

In one or more instances, based on identifying that the first user is not included in the personnel information, the computing platform may: a) deny access, by the second user, to the encrypted file, and b) send, to the second user device, an error notification and one or more commands directing the second user device to display the error notification, which may cause the second user device to display the error notification. In one or more instances, the authorized department may be automatically identified based on contents of the file.

In one or more examples, a subset of the authorized department may be further identified based on the contents of the file, and the personnel information may indicate the subset of the authorized department. In one or more examples, the second classification may be a company related classification. In one or more examples, based on identifying a second classification, the computing platform may: 1) compare the second user to the first user, and 2) based on identifying that the second user is different than the first user, the computing platform may: a) deny access, by the second user, to the encrypted file, and b) send, to the second user device, an error notification and one or more commands directing the second user device to display the error notification, which may cause the second user device to display the error notification.

In one or more instances, the second classification may be a personal classification. In one or more instances, the computing platform may receive, from the first user device, a second request to decrypt the encrypted file. Based on validating an identity of the first user, the computing platform may: 1) decrypt, using the symmetric key, the encrypted file, and 2) grant access, to the first user, to the file. In one or more instances, the symmetric key may be stored in a hardware security module (HSM) of the computing platform, and the computing platform may be configured with a unique protocol to access the HSM.

In one or more examples, identifying the classification of the encrypted file may include identifying, based on classification information included in the request to encrypt the file, the classification. In one or more examples, identifying the classification of the encrypted file may include automatically identifying, based on contents of the file, the classification.

In one or more instances, the symmetric key may be unique to the first user. In one or more instances, enterprise access permissions for the first user may be revoked, and the revocation may occur: after encrypting the file using the symmetric key, and before receiving the request to decrypt the encrypted file. In one or more instances, the symmetric key may be specific to the classification of the encrypted file.

BRIEF DESCRIPTION OF DRAWINGS

The present disclosure is illustrated by way of example and not limited in the accompanying figures in which like reference numerals indicate similar elements and in which:

FIGS. 2A-2H depict an illustrative event sequence for hierarchical encryption and decryption for improved content security in accordance with one or more example embodiments;

FIGS. 3 and 4 depict example graphical user interfaces for hierarchical encryption and decryption for improved content security in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to hierarchical based encryption and decryption techniques for improved content security. For example, employees may store sensitive information on their office devices. The data may be proprietary or company related disclosures, personal data (e.g., paystubs, offer letters, or the like), and/or other information. It may be recommended to encrypt this data to avoid misuse. In the absence of the employee, however, the encrypted proprietary data or company related disclosures may become unusable for the organization or inaccessible to other users.

To address this deficiency, all sensitive data stored on office devices may be encrypted by a data encryption key (DEK) created for the employee. The employee may classify the data as personal, proprietary, or company related. Based on the classification, a key may be created, which may be used to encrypt the content using a centralized cryptographic service.

When an attempt is made to decrypt the content via the centralized cryptographic service, based on the data classification, the service may acquire the data requestor details through an employee hub, and may allow decryption of the content if authorized. As a result, data may be decrypted in the absence of an employee by an authorized person in the organization.

Figure 1A:
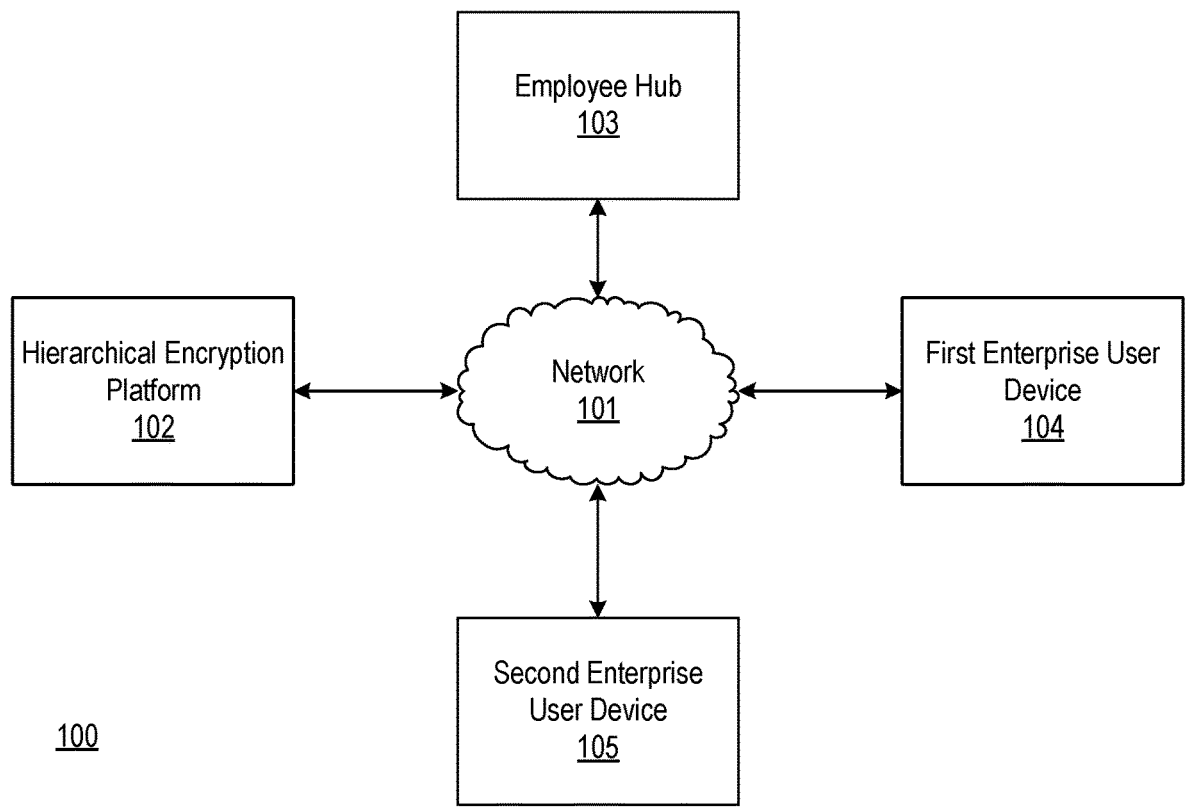
FIGS. 1A and 1B depict an illustrative computing environment for hierarchical encryption and decryption for improved content security in accordance with one or more example embodiments.
Figure 1B:
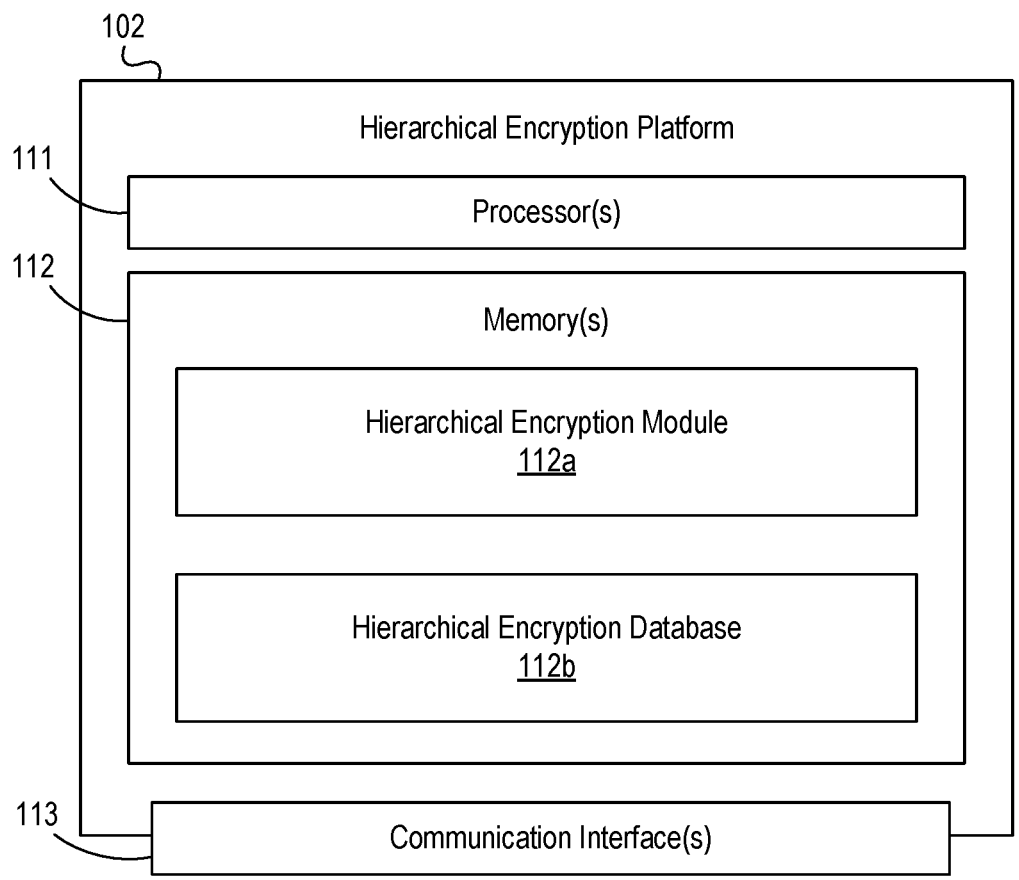

FIGS. 1A-1B depict an illustrative computing environment for implementing hierarchical encryption and decryption for improved content security in accordance with one or more example embodiments. Referring to FIG. 1A, computing environment 100 may include one or more computer systems. For example, computing environment 100 may include hierarchical encryption platform 102, employee hub 103, first enterprise user device 104, and second enterprise user device 105.

As described further below, hierarchical encryption platform 102 may be a computer system that includes one or more computing devices and/or other computer components (e.g., processors, memories, communication interfaces). In addition, hierarchical encryption platform 102 may be configured to perform file encryption using hierarchical based methods based on file classifications (e.g., personal, proprietary, company related, and/or other classifications). In some instances, the hierarchical encryption platform 102 may be configured to generate and store symmetrical keys that may be used to perform the encryption/decryption. In some instances, the hierarchical encryption platform 102 may be configured to access the employee hub 103 (e.g., via application programming interface (API) calls and/or otherwise) to obtain employee hierarchy information, personnel information, and/or other information, as described further below.

Employee hub 103 may be a computer system that includes one or more computing devices (e.g., servers, server blades, or the like) and/or other computer components (e.g., processors, memories, communication interfaces) configured to store and/or otherwise manage employee information. For example, the employee hub 103 may store employee hierarchy information (e.g., indicating managers, managers-of-managers, and/or other team members for given employees), personnel information (e.g., indicating a department and/or subgroup that an employee belongs to (e.g., legal, human resources, finance, administration, or the like), and/or other information. In some instances, the employee hub 103 may be configured to communicate with the hierarchical encryption platform 102 to transmit requested information. Although the employee hub 103 and the hierarchical encryption platform 102 are illustrated as two distinct devices, they may, in some instances, be integrated into a single device without departing from the scope of the disclosure.

First enterprise user device 104 may be and/or include a desktop computer, a laptop computer, a tablet, a mobile device, and/or other device. In some instances, the first enterprise user device 104 may be configured for content creation and/or management by a user (who may, e.g., be an employee of an enterprise organization corresponding to the hierarchical encryption platform 102 and/or employee hub 103). For example, for illustrative purposes, it may be assumed that the user of the first enterprise user device 104 (e.g., a first user) may be the creator and/or otherwise sole manager of the below described file. In some instances, first enterprise user device 104 may cause display of and/or otherwise present one or more graphical user interfaces (e.g., which may e.g., correspond to the file, and/or other interfaces).

Second enterprise user device 105 may be and/or include a desktop computer, a laptop computer, a tablet, a mobile device, and/or other device. In some instances, the second enterprise user device 105 may be configured to access content by a user (who may, e.g., be an employee of an enterprise organization corresponding to the hierarchical encryption platform 102 and/or employee hub 103). For example, for illustrative purposes, it may be assumed that the user of the second enterprise user device 105 (e.g., a second user) may be within the employee hierarchy of the first user, within a department and/or sub-department of the enterprise organization that is relevant to the file, and/or may be an unauthorized user of the file (all of which are described in greater detail below). In some instances, second enterprise user device 105 may cause display of and/or otherwise present one or more graphical user interfaces (e.g., which may e.g., correspond to the file, error notifications, and/or other interfaces). Although two enterprise user devices are illustrated, any number of enterprise user devices may be implemented in the methods described herein without departing from the scope of the disclosure.

Computing environment 100 also may include one or more networks, which may interconnect hierarchical encryption platform 102, employee hub 103, first enterprise user device 104, and second enterprise user device 105. For example, computing environment 100 may include a network 101 (which may interconnect, e.g., hierarchical encryption platform 102, employee hub 103, first enterprise user device 104, and second enterprise user device 105).

In one or more arrangements, hierarchical encryption platform 102, employee hub 103, first enterprise user device 104, and second enterprise user device 105 may be any type of computing device capable of receiving a user interface, receiving input via the user interface, and communicating the received input to one or more other computing devices. For example, hierarchical encryption platform 102, employee hub 103, first enterprise user device 104, second enterprise user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of hierarchical encryption platform 102, employee hub 103, first enterprise user device 104, and/or second enterprise user device 105 may, in some instances, be special-purpose computing devices configured to perform specific functions.

Referring to FIG. 1B, hierarchical encryption platform 102 may include one or more processors 111, memory 112, and communication interface 113. A data bus may interconnect processor 111, memory 112, and communication interface 113. Communication interface 113 may be a network interface configured to support communication between hierarchical encryption platform 102 and one or more networks (e.g., network 101, or the like). Memory 112 may include one or more program modules having instructions that when executed by processor 111 cause hierarchical encryption platform 102 to perform one or more functions described herein and/or one or more databases that may store and/or otherwise maintain information which may be used by such program modules and/or processor 111. In some instances, the one or more program modules and/or databases may be stored by and/or maintained in different memory units of hierarchical encryption platform 102 and/or by different computing devices that may form and/or otherwise make up hierarchical encryption platform 102. For example, memory 112 may have, host, store, and/or include a hierarchical encryption module 112a and a hierarchical encryption database 112b. Hierarchical encryption module 112a may have instructions that direct and/or cause hierarchical encryption platform 103 to execute advanced encryption/decryption techniques, as discussed in greater detail below. Hierarchical encryption database 112b may store information used by hierarchical encryption module 112a and/or hierarchical encryption platform 102 in executing encryption/decryption techniques, and/or in performing other functions.

Figure 2A:
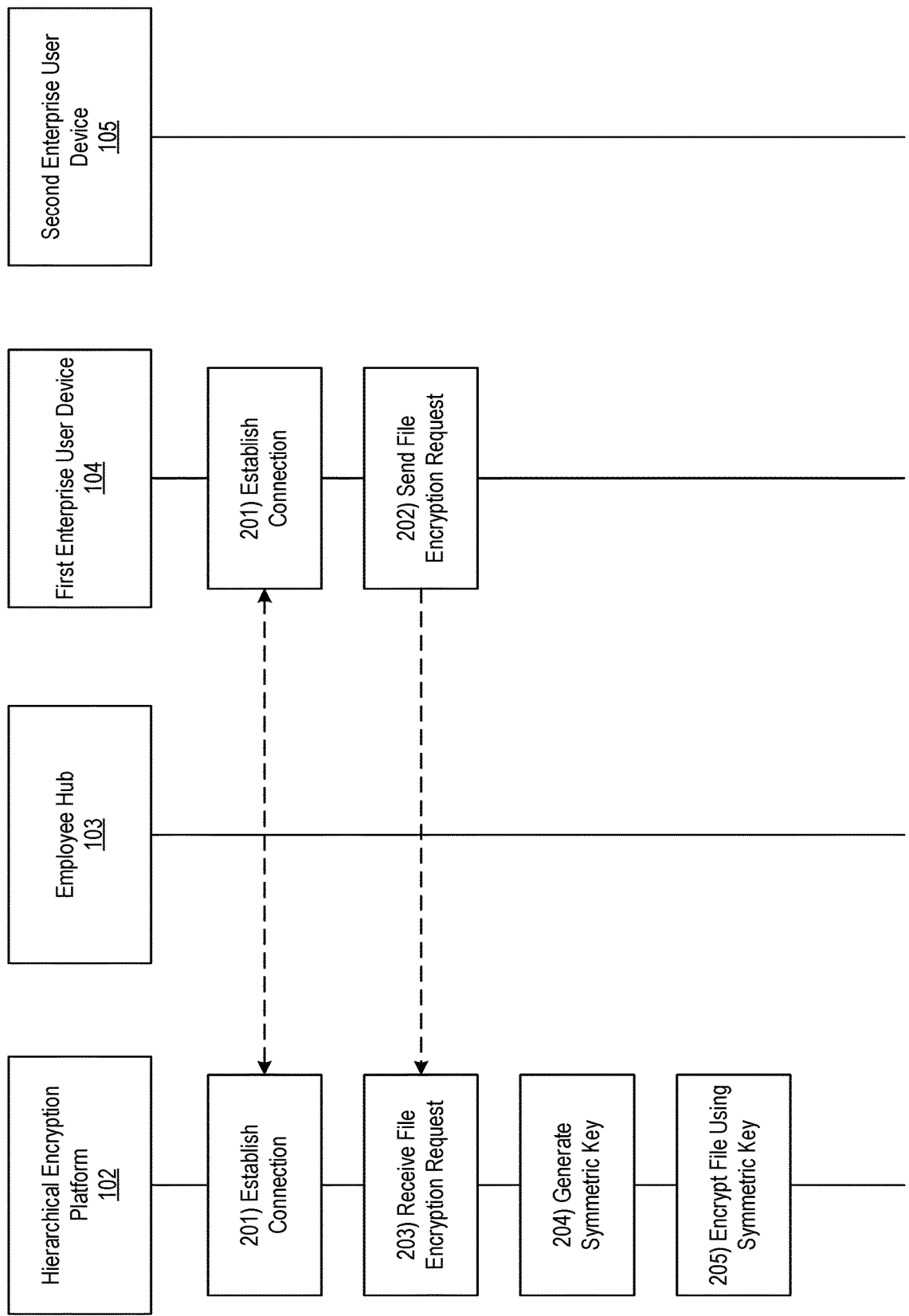

FIGS. 2A-2H describe an illustrative event sequence for implementing hierarchical encryption and decryption for improved content security in accordance with one or more example embodiments. Referring to FIG. 2A, at step 201, the first enterprise user device 104 may establish a connection with the hierarchical encryption platform 102. For example, the first enterprise user device 104 may establish a first wireless data connection with the hierarchical encryption platform 102 to link the first enterprise user device 104 to the hierarchical encryption platform 102 (e.g., in preparation for sending file encryption requests). In some instances, the first enterprise user device 104 may identify whether or not a connection is already established with the hierarchical encryption platform 102. If a connection is already established with the hierarchical encryption platform 102, the first enterprise user device 104 might not re-establish the connection. Otherwise, if a connection is not yet established with the hierarchical encryption platform 102, the first enterprise user device 104 may establish the first wireless data connection as described herein.

At step 202, the first enterprise user device 104 may send a file encryption request to the hierarchical encryption platform 102. For example, the first enterprise user device 104 may send a request to encrypt a file (e.g., document, spreadsheet, slideshow, media, and/or other file). In this example, a user of the first enterprise user device 104 (e.g., a first user) may have sole custody of the file. For example, the first user may be a creator of the file and/or otherwise solely have access to the file. In some instances, the first enterprise user device 104 may send, along with the file encryption request, a classification of the file. For example, the first enterprise user device 104 may send a classification of personal, proprietary, company related, and/or otherwise, which may, in some instances, be specified by the first user. In some instances, the first enterprise user device 104 may send the file encryption request while the first wireless data connection is established.

At step 203, hierarchical encryption platform 102 may receive the file encryption request sent at step 202. In some instances, the hierarchical encryption platform 102 may receive, along with the file encryption request, the file itself. In some instances, the hierarchical encryption platform 102 may receive the classification information for the file. For example, the hierarchical encryption platform 102 may receive the file encryption request via the communication interface 113 and while the first wireless data connection is established.

At step 204, the hierarchical encryption platform 102 may generate a symmetric key for use in encrypting the file. In some instances, the hierarchical encryption platform 102 may generate a symmetric key that may be used for both encryption of the file and decryption of the file, once encrypted. In some instances, the hierarchical encryption platform 102 may generate a symmetric key that is specific to the first user (e.g., only usable by the first user at the time of its creation, although the symmetric key may, in some instances be accessible by an authorized user for file decryption upon departure of the first user from the enterprise as described below).

In some instances, the hierarchical encryption platform 102 may generate the symmetric key based on the classification information (which may, e.g., have been specified by the first user). In some instances, the classification information might not have been received, and the hierarchical encryption platform 102 may identify the classification of the file based on contents of the file. For example, the hierarchical encryption platform 102 may apply one or more natural language processing (NLP) techniques, natural language understanding (NLU) techniques, machine learning techniques, and/or other techniques to identify, based on contents of the file, a classification of the file. In some instances, the hierarchical encryption platform 102 may apply these techniques to automatically validate a classification of the file provided by the first user, which may, e.g., protect against unwarranted classification of the file by the first user (such as classifying every file as personal, and thus preventing any access by other employees in their absence).

In instances where the file is identified to be public, the hierarchical encryption platform 102 may identify that no encryption measures should be performed. In these instances, the event sequence may end, and the file may be subsequently accessed by any user device requesting access to it (e.g., including the first enterprise user device 104, second enterprise user device 105, and/or other devices).

In instances where the file is identified to be personal, the hierarchical encryption platform 102 may identify that only the first user should have access to the file. In these instances, the hierarchical encryption platform 102 may generate a personal symmetric key, which may be authorized for use exclusively by the first user. In doing so, the hierarchical encryption platform 102 may prevent access to personal documents (such as paystubs, offer letters, and/or other personal documents) except in instances of the true document owner.

In instances where the file is identified to be proprietary, the hierarchical encryption platform 102 may identify that members of an employee hierarchy (e.g., a direct manager, a team lead, or the like) for the first user should have access to the file, along with the first user. In these instances, the hierarchical encryption platform 102 may generate a proprietary symmetric key, which may be authorized for use exclusively by the first user and members of their corresponding employee hierarchy. In doing so, in the event that the first user exits (e.g., retires, quits, is fired, and/or otherwise leaves) the company, another employee such as a boss, supervisor, or the like of the first user may be able to access files that may have previously been maintained and/or accessed only by the first user, but may be proprietary to the enterprise. As a result, the contents of the file might not be lost due to the first user's separation from the enterprise.

In instances where the file is identified to be company related, the hierarchical encryption platform 102 may identify that members (e.g., either all or a given subset) of a particular department within an enterprise of the first user (e.g., legal department, human resources department, and/or other department) should have access to the file. In these instances, the hierarchical encryption platform 102 may generate a company related symmetric key, which may be authorized for use exclusively by the first user and the identified members of the relevant department. In doing so, in the event that the first user exits (e.g., retires, quits, is fired, and/or otherwise) the company, another employee such as a member of the human resources team, legal team, and/or otherwise of the enterprise may be able to access files that may have previously been maintained and/or accessed only by the first user, but may be relevant to the enterprise for one reason or another. As a result, the contents of the file might not be lost due to the first user's exit.

At step 205, the hierarchical encryption platform 102 may encrypt the file using the symmetric key generated at step 204. For example, the hierarchical encryption platform 102 may encrypt the file so as to prevent access to the file by anyone other than those identified based on the classification information, as described above. This may be especially beneficial in the event that the first user leaves the enterprise and turns their hardware devices (e.g., such as the first enterprise user device 104) and/or files over to a technical support team. For example, any files that might not be configured with encryption may be susceptible to malicious intent by an individual on the support team and/or an individual to which the support team transfers a file. Rather than needing to wipe the hardware upon the first users departure to prevent the above described scenario, all files may be encrypted as described herein, which may both protect the files from any malicious intent (e.g., because no bad actor may be able to access the files) and preserve the content of such files (which may, in some instances, be relevant to enterprise operations and/or otherwise proprietary and may have previously only been in the custody of the first user).

Figure 2B:
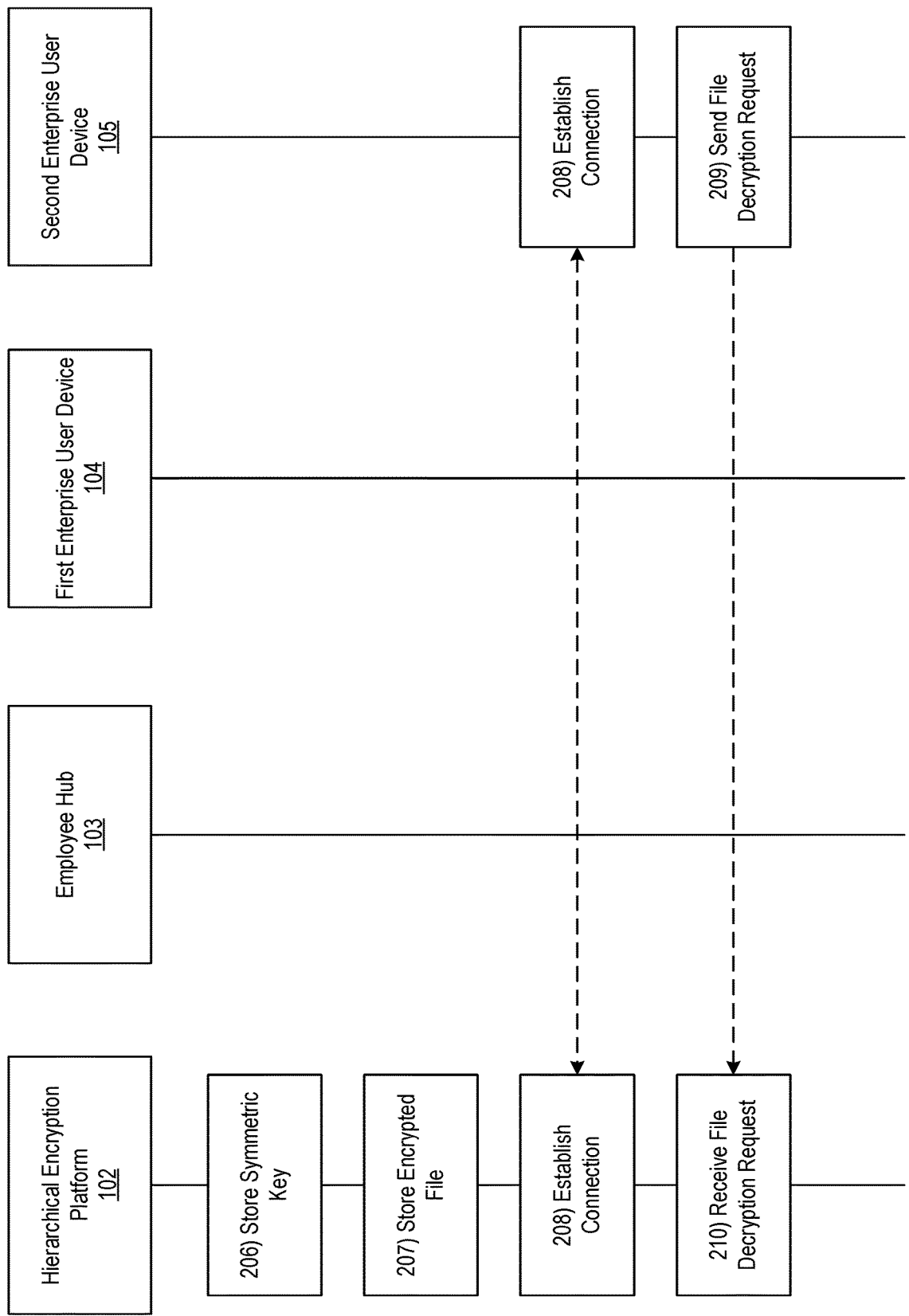

Referring to FIG. 2B, at step 206, the hierarchical encryption platform 102 may store the symmetric key used to encrypt the file. For example, the hierarchical encryption platform 102 may store the symmetric key using a hardware security module (HSM). In these instances, the hierarchical encryption platform 102 may be uniquely configured with a protocol to access the HSM, thus preventing any other devices from accessing the HSM. Similarly, the symmetric key might not be distributed to any other devices. This may provide an additional layer of security for the decryption keys by effectively storing the symmetric key in a protected vault to which only the hierarchical encryption platform 102 has access.

At step 207, the hierarchical encryption platform 102 may store the encrypted file. Additionally or alternatively, the encrypted file may be stored using a shared drive, locally at the first enterprise user device 104, and/or otherwise. In some instances, in storing the encrypted file, the hierarchical encryption platform 102 may also store the classification information for the encrypted file, an identity of the first user (e.g., the content creator, or the like), and/or other information.

At step 208, the second enterprise user device 105 may establish a connection with the hierarchical encryption platform 102. For example, the second enterprise user device 105 may establish a second wireless data connection with the hierarchical encryption platform 102 to link the second enterprise user device 105 to the hierarchical encryption platform 102 (e.g., in preparation for sending file decryption requests). In some instances, the second enterprise user device 105 may identify whether or not a connection is already established with the hierarchical encryption platform 102. If a connection is already established with the hierarchical encryption platform 102, the second enterprise user device 105 might not re-establish the connection. If a connection is not yet established with the hierarchical encryption platform 102, the second enterprise user device 105 may establish the second wireless data connection as described herein.

At step 209, the second enterprise user device 105 may send a file decryption request, requesting to decrypt the file, to the hierarchical encryption platform 102 (e.g., on behalf of a user of the second enterprise user device 105, such as a second user). For example, the second enterprise user device 105 may send the file decryption request based on or in response to the first user's exit from the enterprise and/or for other purposes. In some instances, the second enterprise user device 105 may send the file decryption request while the second wireless data connection is established.

At step 210, the second enterprise user device 105 may receive the file decryption request sent at step 209. For example, the second enterprise user device 105 may receive the file decryption request via the communication interface 113 and while the second wireless data connection is established.

In some instances, at the time the file decryption request is received, file access permissions may have been revoked for the first user (e.g., due to departure of the first user from the enterprise). For example, such permissions may have been revoked prior to receipt of the file decryption request. In some instances, the first enterprise user device 104 may have been returned to an information technology department and/or other individual at the enterprise. Due to the encryption of the file, however, employees of the information technology and/or other department not identified as authorized to access the file may be unable to access the file. Furthermore, as a result of the encryption, the files of the first user might not need to be wiped (e.g., deleted) from the first enterprise user device 104 and/or a central file store, as the encryption measures may prevent unauthorized access (which may, e.g., preserve these files for access by an authorized user as described further below).

Referring to FIG. 2C, at step 211, the hierarchical encryption platform 102 may identify a classification of the file for which decryption is requested. For example, the hierarchical encryption platform 102 may have previously stored a correlation between the file and its corresponding classification (e.g., in a lookup table, on a file by file basis, and/or otherwise). Based on identifying that the file classification is proprietary, the hierarchical encryption platform 102 may proceed to step 212. Based on identifying that the file classification is company related, the hierarchical encryption platform 102 may proceed to step 224. Based on identifying that the file classification is personal, the hierarchical encryption platform 102 may proceed to step 235.

At step 212, the hierarchical encryption platform 102 may establish a connection with the employee hub 103. For example, the hierarchical encryption platform 102 may establish a third wireless data connection with the employee hub 103 to link the hierarchical encryption platform 102 to the employee hub 103 (e.g., in preparation for sending API calls and obtaining information in response). In some instances, the hierarchical encryption platform 102 may identify whether or not a connection is already established with the employee hub 103. If a connection is already established with the employee hub 103, the hierarchical encryption platform 102 might not re-establish the connection. If a connection is not yet established with the employee hub 103, the hierarchical encryption platform 102 may establish the third wireless data connection as described herein.

At step 213, the hierarchical encryption platform 102 may send an API call to the employee hub 103 requesting employee hierarchy information for the first user. For example, the hierarchical encryption platform 102 may identify that the first user is the content creator and/or otherwise controls access to the encrypted file. As a result, the hierarchical encryption platform 102 may send an API call requesting the employee hierarchy information for the first user, which may, e.g., include information identifying a manager, team lead, team member, boss, and/or other employees who may be part of an employee hierarchy for the first user, and thus may have access to the file given the proprietary classification of the file. In some instances, the hierarchical encryption platform 102 may send the API call to the employee hub 103 via the communication interface 113 and while the third wireless data connection is established.

At step 214, the employee hub 103 may receive the API call sent at step 213. For example, the hierarchical encryption platform 102 may receive the API call while the third wireless data connection is established.

At step 215, the employee hub 103 may identify, in response to receiving the API call at step 214, the employee hierarchy for the first user. For example, the employee hub 103 may be preconfigured with relationships between various employees, their departments, their teams, and/or otherwise, so that such information may be identified (e.g., based on an identity of the first user) by the employee hub 103.

Figure 2D:
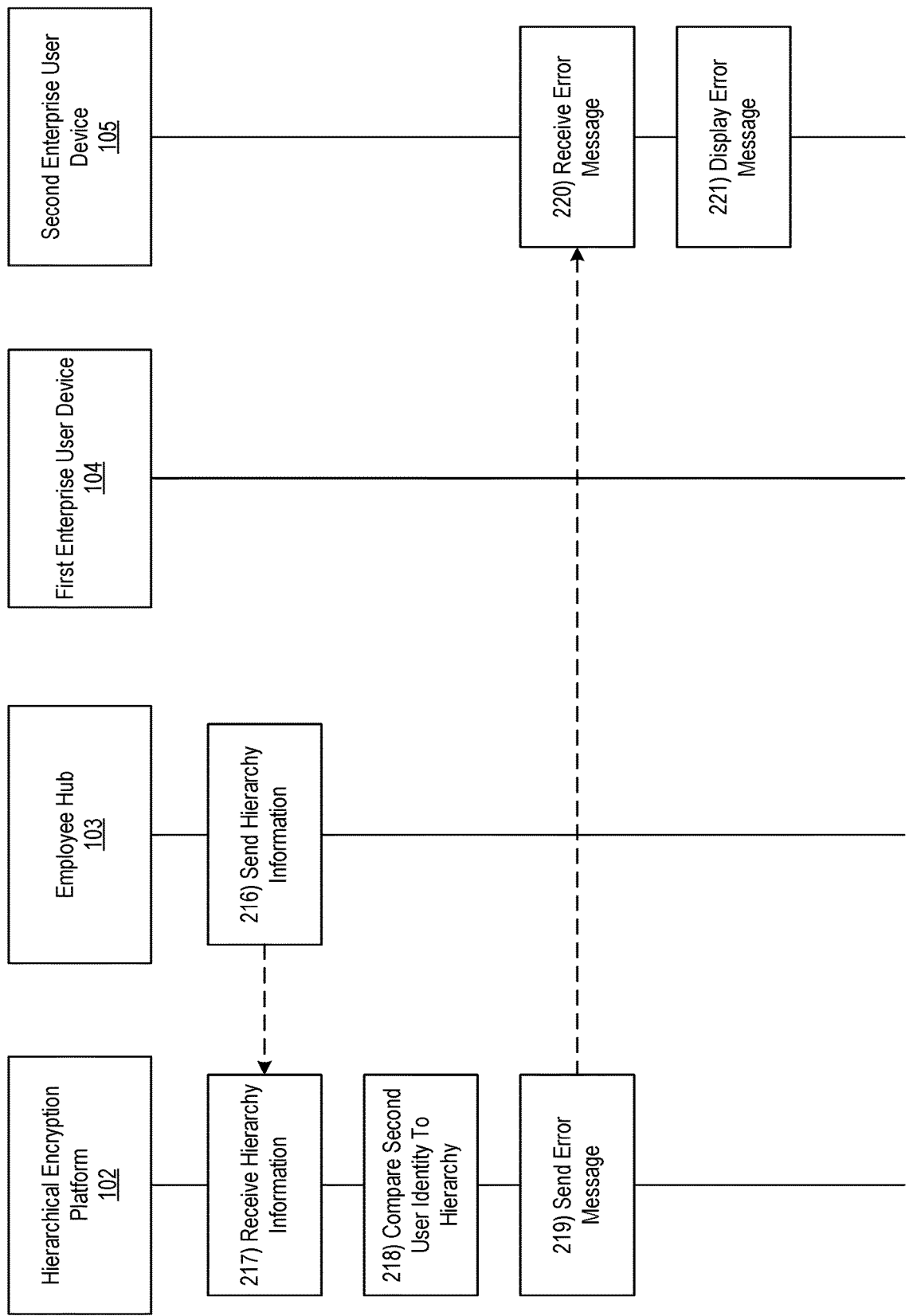

Referring to FIG. 2D, at step 216, after identifying the employee hierarchy information, the employee hub 103 may send the employee hierarchy information to the hierarchical encryption platform 102. For example, the employee hub 103 may send the employee hierarchy information while the third wireless data connection is established.

At step 217, the hierarchical encryption platform 102 may receive the employee hierarchy information sent at step 216. For example, the hierarchical encryption platform 102 may receive the employee hierarchy information via the communication interface 113 and while the third wireless data connection is established.

Although steps 212-217 describe communicating with a separate employee hub 103 to obtain the employee hierarchy information, in some instances, the employee hub 103 may be integrated into the hierarchical encryption platform 102 without departing from the scope of the disclosure.

At step 218, the hierarchical encryption platform 102 may compare the second user identity to the employee hierarchy information received at step 217 (e.g., to identify whether the second user is within the employee hierarchy for the first user, each of whom may be approved to access the file). If the hierarchical encryption platform 102 identifies that the second employee is not within the employee hierarchy for the first user, the hierarchical encryption platform 102 may proceed to step 219.

At step 219, the hierarchical encryption platform 102 may send an error message to the second enterprise user device 105. For example, the hierarchical encryption platform 102 may send the error message to the second enterprise user device 105 via the communication interface 113 and while the second wireless data connection is established. In some instances, the hierarchical encryption platform 102 may also send one or more commands directing the second enterprise user device 105 to display the error message.

At step 220, the second enterprise user device 105 may receive the error message sent at step 219. For example, the second enterprise user device 105 may receive the error message while the second wireless data connection is established. In some instances, the second enterprise user device 105 may also receive the one or more commands directing the second enterprise user device 105 to display the error message.

At step 221, based on or in response to the one or more commands directing the second enterprise user device 105 to display the error message, the second enterprise user device 105 may display the error message. For example, the second enterprise user device 105 may display a graphical user interface similar to graphical user interface 305, which is illustrated in FIG. 3. Subsequently the method may end.

Figure 2E:
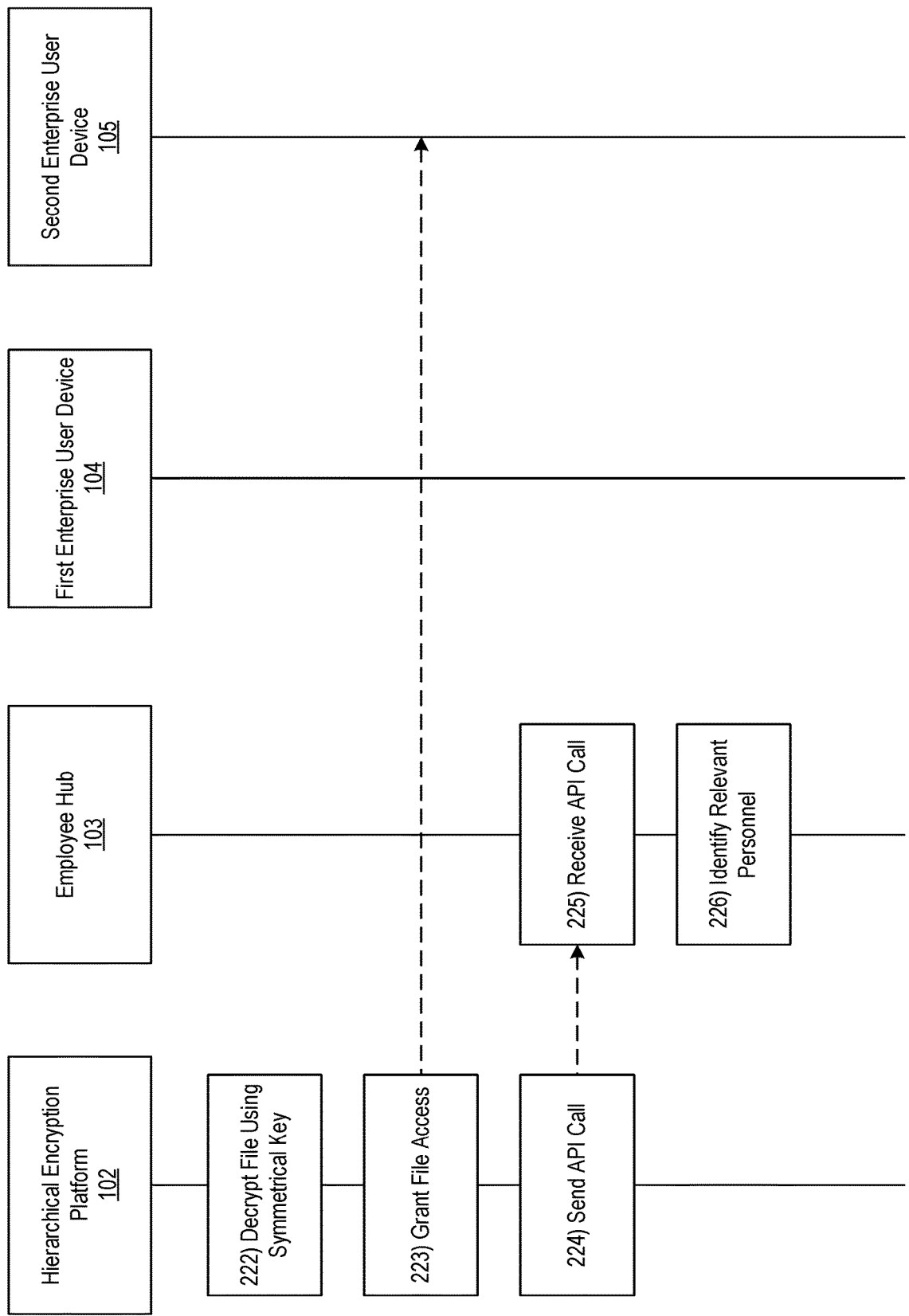

Returning to step 218, if the hierarchical encryption platform 102 identified that the second user is included in the employee hierarchy for the first user, the hierarchical encryption platform 102 may proceed to step 222. Referring to FIG. 2E, at step 222, the hierarchical encryption platform 102 may decrypt the encrypted file using the symmetric key (e.g., the same key used to encrypt the file at step 205). For example, the hierarchical encryption platform 102 may access the HSM to obtain the symmetric key, and may subsequently use the symmetric key to decrypt the encrypted file. After decrypting the file, the hierarchical encryption platform 102 may return the symmetric key to the HSM for storage. In doing so, the hierarchical encryption platform 102 may provide improved security measures by retaining custody of the symmetric key (e.g., rather than distributing it to all authorized users).

At step 223, the hierarchical encryption platform 102 may grant file access (e.g., for the decrypted file) to the second user. For example, the hierarchical encryption platform 102 may transfer the decrypted file to the second enterprise user device 105, enable access for the second user at a shared server, and/or otherwise provide file access. In some instances, the hierarchical encryption platform 102 may send one or more commands directing the enterprise user device 105 to display a graphical user interface similar to graphical user interface 405, which is illustrated in FIG. 4 (which may, e.g., cause the enterprise user device 105 to display the graphical user interface). Subsequently, the method may end.

Returning to step 211, if the hierarchical encryption platform 102 identified that the file classification for the file is company related, the hierarchical encryption platform 102 may proceed to step 224. At step 224, the hierarchical encryption platform 102 may send an API call to the employee hub 103 requesting personnel information for the file. For example, the hierarchical encryption platform 102 may identify that the file pertains to human resources, legal, and/or other departments of the enterprise, and may request information identifying the members of those departments. In some instances, the hierarchical encryption platform 102 may identify the relevant departments (e.g., departments for which authorization to access the file should be granted) and/or sub-groups within those departments based on the classification of the file and/or otherwise automatically based on the content of the file using NLU, NLP, machine learning, and/or other techniques. For example, the hierarchical encryption platform 102 may identify that the file pertains not only to the legal department, but to a specific group within the legal department, such as the intellectual property group. For example, the requested personnel information may request the identities of members of the intellectual property group of the legal department, rather than the entire legal department.

As a result, the hierarchical encryption platform 102 may send an API call requesting the personnel information for the file, which may, e.g., include information identifying individuals that may be part of a relevant department and/or team and thus may have access to the file given the company related classification of the file. In some instances, the hierarchical encryption platform 102 may send the API call to the employee hub 103 via the communication interface 113 and while the third wireless data connection is established.

At step 225, the employee hub 103 may receive the API call sent at step 224. For example, the hierarchical encryption platform 102 may receive the API call while the third wireless data connection is established.

At step 226, the employee hub 103 may identify, in response to receiving the API call at step 225, the personnel information for the file. For example, the employee hub 103 may be preconfigured with relationships between various employees, their departments, their teams, and/or otherwise, so that such information may be identified by the employee hub 103.

Figure 2F:
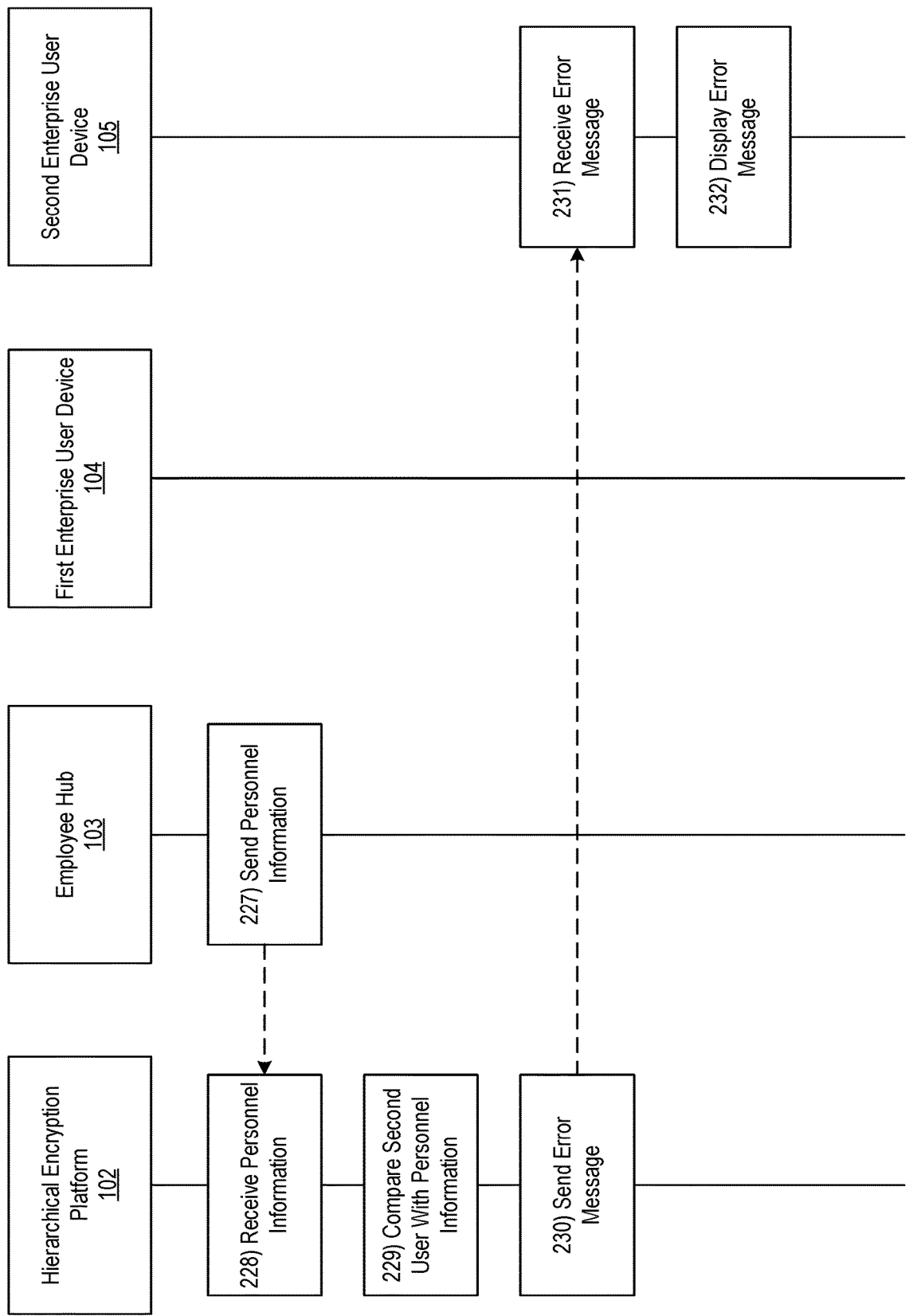

Referring to FIG. 2F, at step 227, after identifying the personnel information, the employee hub 103 may send the personnel information to the hierarchical encryption platform 102. For example, the employee hub 103 may send the personnel information while the third wireless data connection is established.

At step 228, the hierarchical encryption platform 102 may receive the personnel information sent at step 216. For example, the hierarchical encryption platform 102 may receive the personnel information via the communication interface 113 and while the third wireless data connection is established.

Although steps 224-228 describe communicating with a separate employee hub 103 to obtain the personnel information, in some instances, the employee hub 103 may be integrated into the hierarchical encryption platform 102 without departing from the scope of the disclosure.

At step 229, the hierarchical encryption platform 102 may compare the second user identity to the personnel information received at step 228 (e.g., to identify whether the second user is within the approved personnel for the file, each of whom may be approved to access the file). If the hierarchical encryption platform 102 identifies that the second employee is not within the approved personnel, the hierarchical encryption platform 102 may proceed to step 230.

At step 230, the hierarchical encryption platform 102 may send an error message to the second enterprise user device 105. For example, the hierarchical encryption platform 102 may send the error message to the second enterprise user device 105 via the communication interface 113 and while the second wireless data connection is established. In some instances, the hierarchical encryption platform 102 may also send one or more commands directing the second enterprise user device 105 to display the error message.

At step 231, the second enterprise user device 105 may receive the error message sent at step 230. For example, the second enterprise user device 105 may receive the error message while the second wireless data connection is established. In some instances, the second enterprise user device 105 may also receive the one or more commands directing the second enterprise user device 105 to display the error message.

At step 232, based on or in response to the one or more commands directing the second enterprise user device 105 to display the error message, the second enterprise user device 105 may display the error message. For example, the second enterprise user device 105 may display a graphical user interface similar to graphical user interface 305, which is illustrated in FIG. 3. Subsequently the method may end.

Figure 2G:
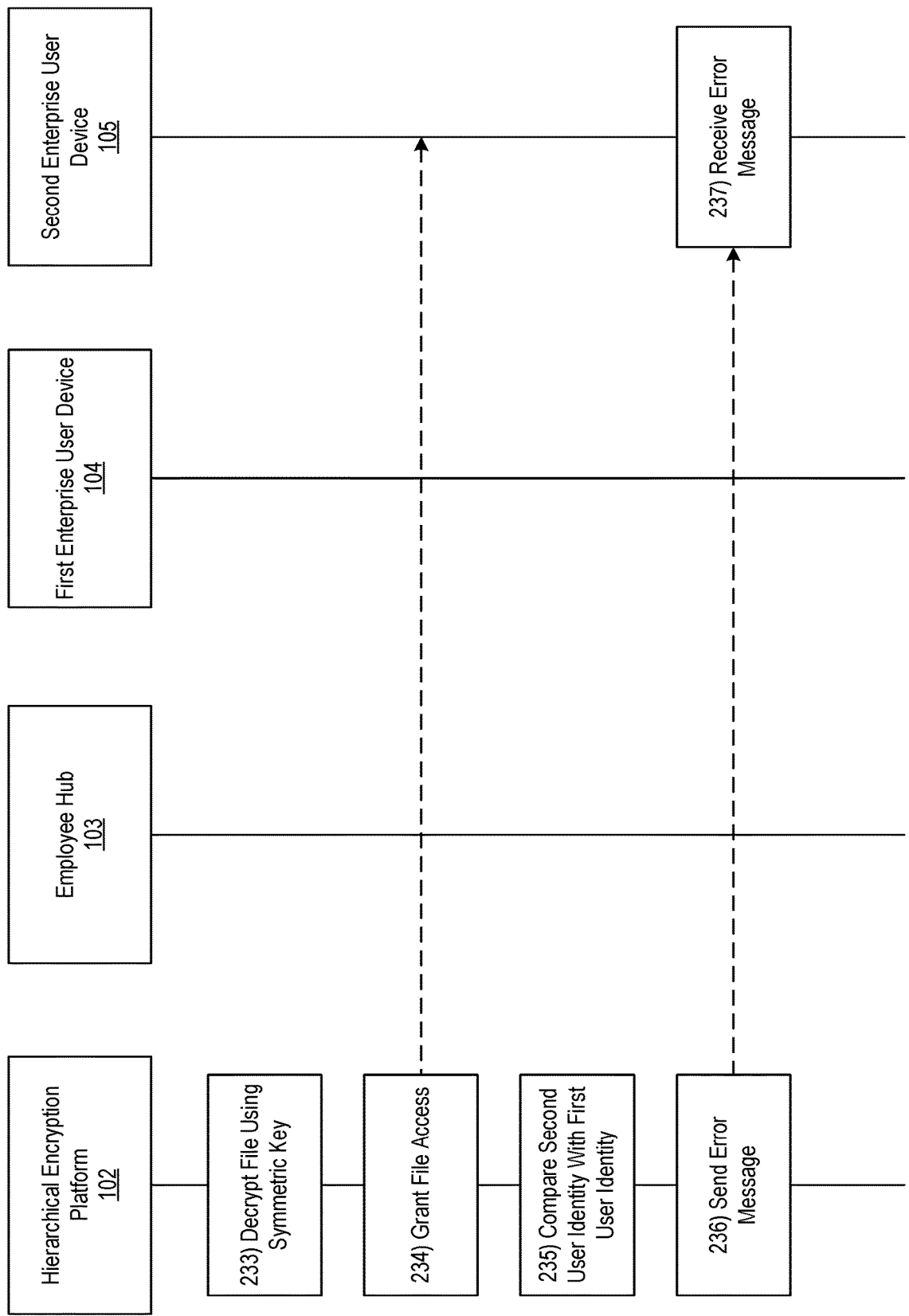

Returning to step 229, if the hierarchical encryption platform 102 identified that the second user is included in the relevant personnel for the file, the hierarchical encryption platform 102 may proceed to step 233. Referring to FIG. 2G, at step 233, the hierarchical encryption platform 102 may decrypt the encrypted file using the symmetric key (e.g., the same key used to encrypt the file at step 205). For example, the hierarchical encryption platform 102 may access the HSM to obtain the symmetric key, and may subsequently use the symmetric key to decrypt the encrypted file. After decrypting the file, the hierarchical encryption platform 102 may return the symmetric key to the HSM for storage. In doing so, the hierarchical encryption platform 102 may provide improved security measures by retaining custody of the symmetric key (e.g., rather than distributing it to all authorized users).

At step 234, the hierarchical encryption platform 102 may grant file access (e.g., for the decrypted file) to the second user. For example, the hierarchical encryption platform 102 may transfer the decrypted file to the second enterprise user device 105, enable access for the second user at a shared server, and/or otherwise provide file access. In some instances, the hierarchical encryption platform 102 may send one or more commands directing the enterprise user device 105 to display a graphical user interface similar to graphical user interface 405, which is illustrated in FIG. 4

(which may, e.g., cause the enterprise user device 105 to display the graphical user interface). Subsequently, the method may end.

Returning to step 211, if the hierarchical encryption platform 102 identified that the file classification is personal, the hierarchical encryption platform 102 may proceed to step 235. At step 235, the hierarchical encryption platform 102 may compare an identity of the second user with the identity of the first user. For example, the hierarchical encryption platform 102 may identify that the first user is the content creator and/or otherwise controls access to the encrypted file. As a result of the personal classification, the hierarchical encryption platform 102 may identify that no one other than the first user may decrypt the file. Accordingly, the hierarchical encryption platform 102 may identify whether or not the individual requesting the file is the first user. If there is a match between the requesting user and the first user, the hierarchical encryption platform 102 may decrypt the file using the symmetric key and grant the file access (e.g., as described above with regard to steps 233 and 234). However, if the hierarchical encryption platform 102 identifies that the user identities do not match, the hierarchical encryption platform 102 may proceed to step 236.

At step 236, the hierarchical encryption platform 102 may send an error message to the second enterprise user device 105. For example, the hierarchical encryption platform 102 may send the error message to the second enterprise user device 105 via the communication interface 113 and while the second wireless data connection is established. In some instances, the hierarchical encryption platform 102 may also send one or more commands directing the second enterprise user device 105 to display the error message.

At step 237, the second enterprise user device 105 may receive the error message sent at step 230. For example, the second enterprise user device 105 may receive the error message while the second wireless data connection is established. In some instances, the second enterprise user device 105 may also receive the one or more commands directing the second enterprise user device 105 to display the error message.

Figure 2H:
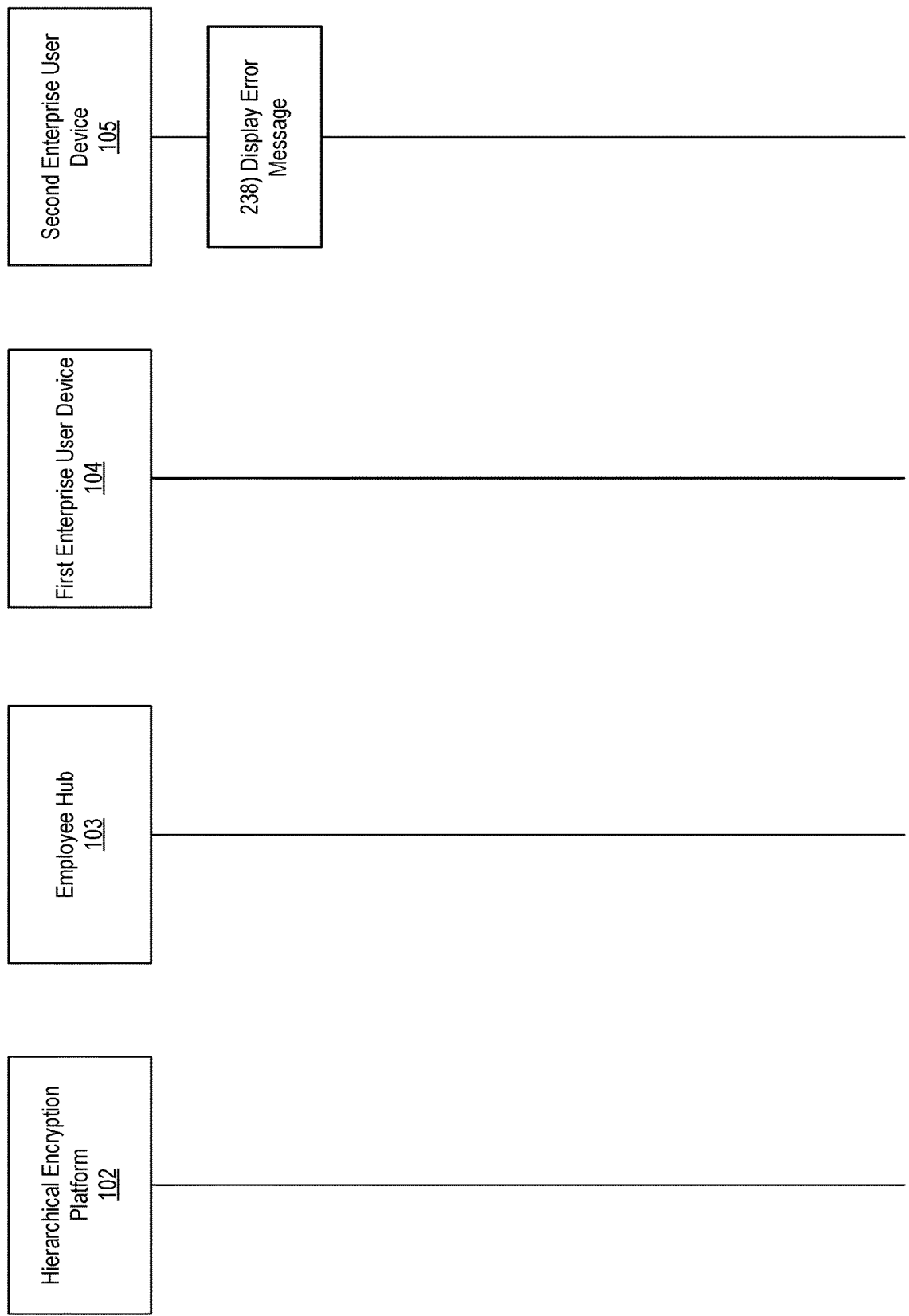

Referring to FIG. 2H, at step 238, based on or in response to the one or more commands directing the second enterprise user device 105 to display the error message, the second enterprise user device 105 may display the error message. For example, the second enterprise user device 105 may display a graphical user interface similar to graphical user interface 305, which is illustrated in FIG. 3. Subsequently the method may end.

As a result of the above described methods, the benefits of file encryption may be achieved, without incurring data loss due to departure of a file owner/creator from the corresponding enterprise. Furthermore, the file owner/creator might not need to specify a list of authorized users, rather, such users may be automatically identified based on a classification of the file. Additionally, because the symmetric keys are centrally stored (e.g., not distributed) and due to their storage using an HSM, additional security advantages may be achieved.

Figure 5:
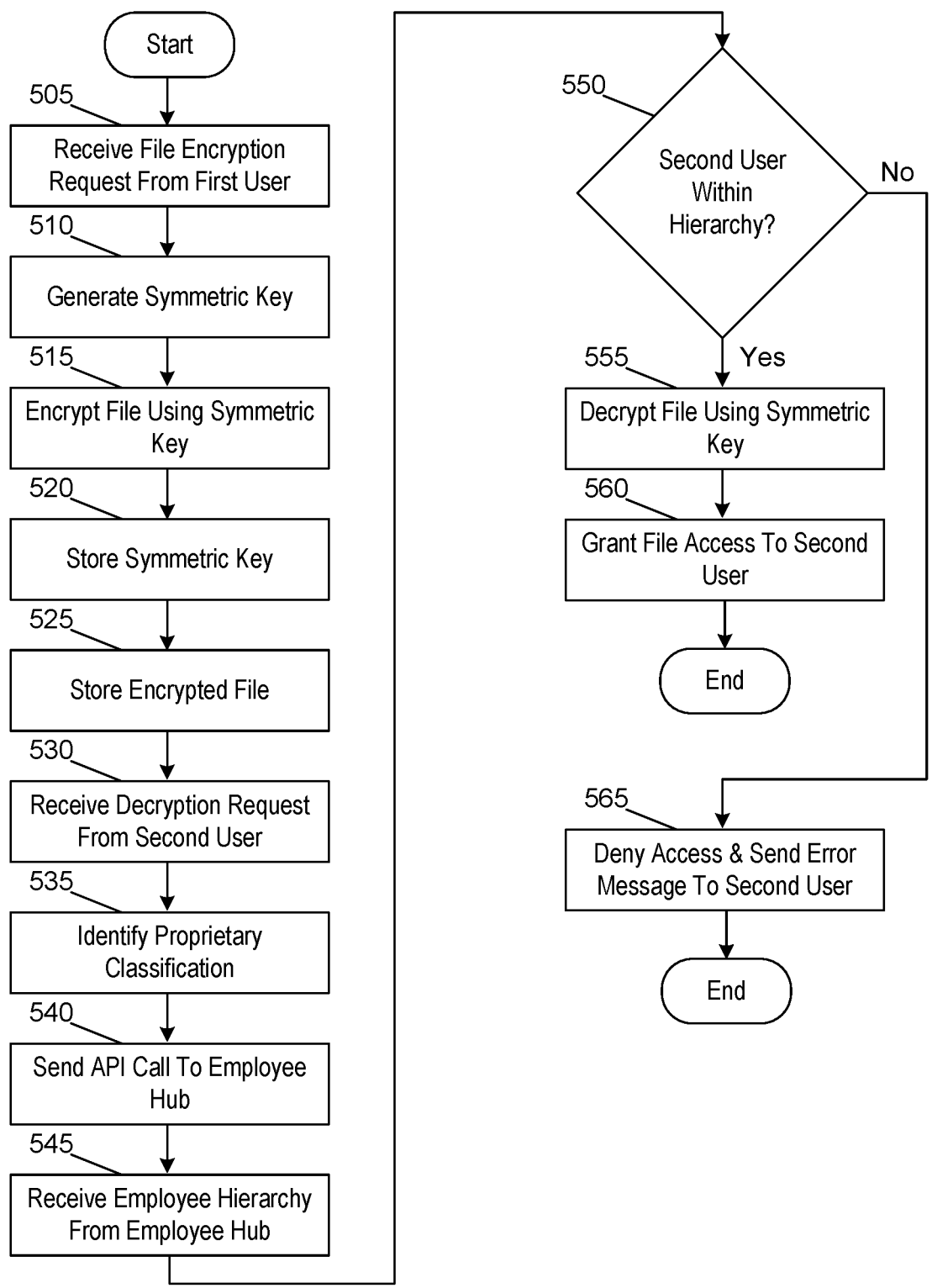
FIGS. 5-7 depict illustrative methods for hierarchical encryption and decryption for improved content security in accordance with one or more example embodiments.

FIG. 5 depicts an illustrative method for implementing hierarchical decryption of proprietary files for improved content security in accordance with one or more example embodiments. Referring to FIG. 5, at step 505, a computing platform comprising one or more processors, memory, and a communication interface may receive a file encryption request from a first user. At step 510, the computing platform may generate a symmetric key. At step 515, the computing platform may encrypt the file using the symmetric key. At step 520, the computing platform may store the symmetric key using an HSM. At step 525, the computing platform may store the encrypted file. At step 530, the computing platform may receive a decryption request from a second user. At step 535, the computing platform may identify that the file is classified as proprietary. At step 540, the computing platform may send an API call to an employee hub to identify an employee hierarchy for the first user. At step 545, the computing platform may receive the employee hierarchy information for the first user.

At step 550, the computing platform may identify whether or not the second user is within the employee hierarchy for the first user. If the second user is within the employee hierarchy for the first user, the computing platform may proceed to step 555. At step 555, the computing platform may decrypt the file using the symmetric key. At step 560, the computing platform may grant file access to the second user.

Returning to step 550, if the computing platform identifies that the second user is not within the employee hierarchy for the first user, the computing platform may proceed to step 565. At step 565, the computing platform may deny access to the file and may send an error message to the second user.

Figure 6:
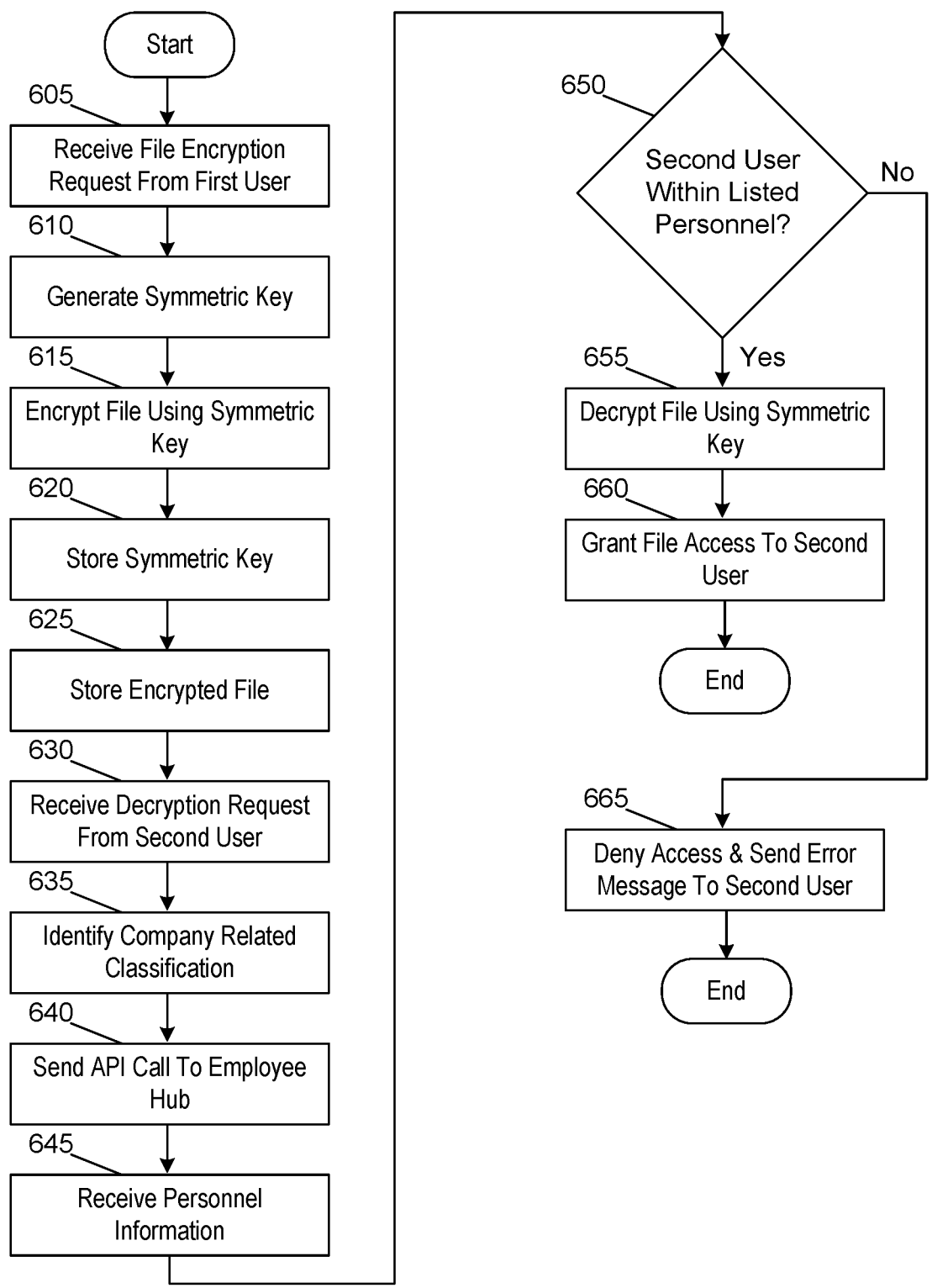

FIG. 6 depicts an illustrative method for implementing hierarchical decryption of company related files for improved content security in accordance with one or more example embodiments. Referring to FIG. 6, at step 605, a computing platform comprising one or more processors, memory, and a communication interface may receive a file encryption request from a first user. At step 610, the computing platform may generate a symmetric key. At step 615, the computing platform may encrypt the file using the symmetric key. At step 620, the computing platform may store the symmetric key using an HSM. At step 625, the computing platform may store the encrypted file. At step 630, the computing platform may receive a decryption request from a second user. At step 635, the computing platform may identify that the file is classified as company related. At step 640, the computing platform may send an API call to an employee hub to identify personnel information for the file. At step 645, the computing platform may receive the personnel information for the file.

At step 650, the computing platform may identify whether or not the second user is within the personnel information. If the second user is within the personnel information, the computing platform may proceed to step 655. At step 655, the computing platform may decrypt the file using the symmetric key. At step 660, the computing platform may grant file access to the second user.

Returning to step 650, if the computing platform identifies that the second user is not within the personnel information, the computing platform may proceed to step 665. At step 665, the computing platform may deny access to the file and may send an error message to the second user.

Figure 7:
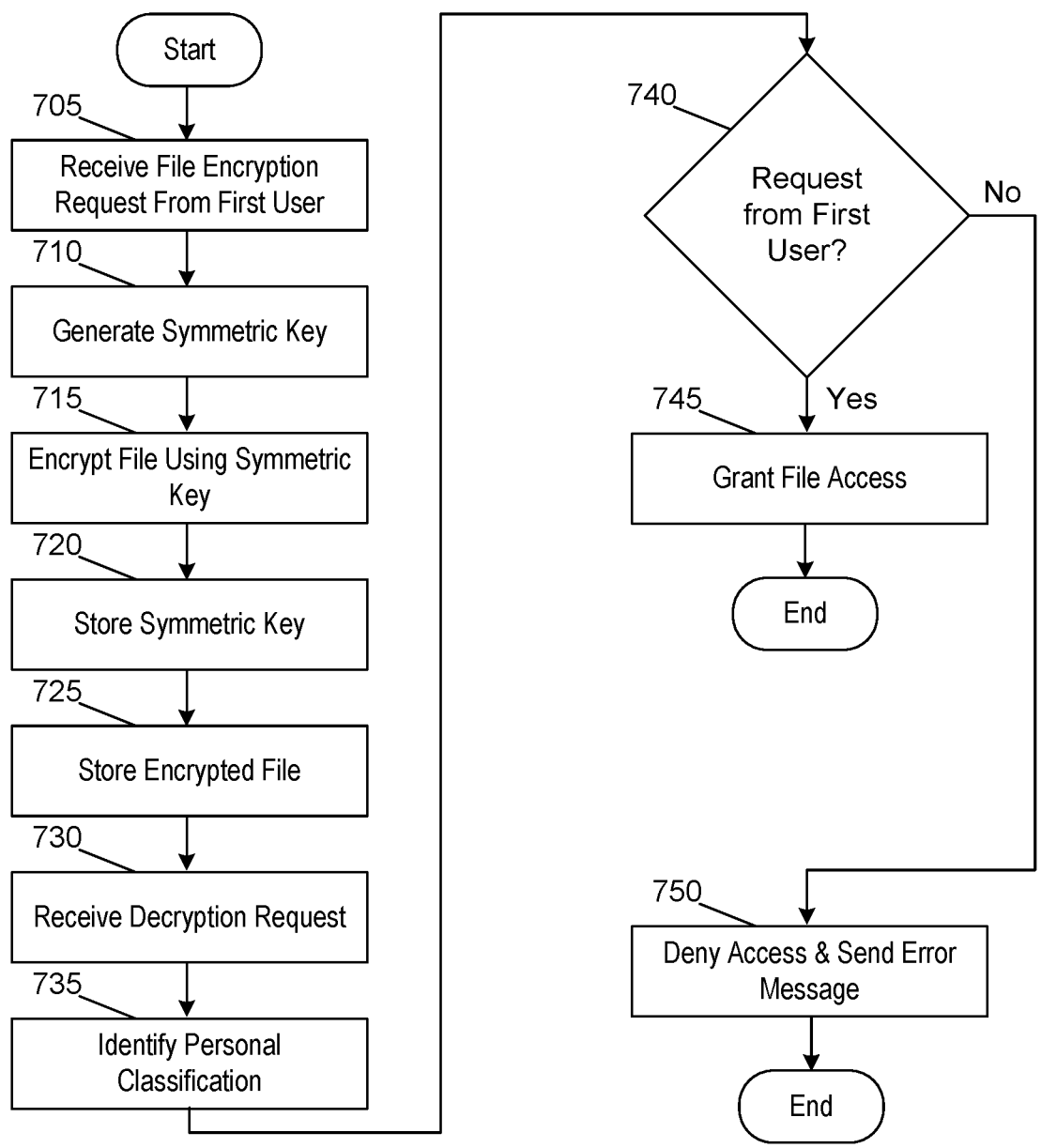

FIG. 7 depicts an illustrative method for implementing hierarchical decryption of personal files for improved content security in accordance with one or more example embodiments. Referring to FIG. 7, at step 705, a computing platform comprising one or more processors, memory, and a communication interface may receive a file encryption request from a first user. At step 710, the computing platform may generate a symmetric key. At step 715, the computing platform may encrypt the file using the symmetric key. At step 720, the computing platform may store the symmetric key using an HSM. At step 725, the computing platform may store the encrypted file. At step 730, the computing platform may receive a decryption request from a second user. At step 735, the computing platform may identify that the file is classified as personal.

At step 740, the computing platform may identify whether or not the decryption request was received from the first user. If the second request was received from the first user, the computing platform may proceed to step 745. At step 745, the computing platform may grant file access to the second user.

Returning to step 740, if the computing platform identifies that the request is not from the first user, the computing platform may proceed to step 750. At step 750, the computing platform may deny access to the file and may send an error message to the second user.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the processor, cause the computing platform to:
      receive, from a first user device of a first user, a request to encrypt a file;
      generate, for the file, a symmetric key;
      encrypt, using the symmetric key, the file to produce an encrypted file;
      receive, from a second user device of a second user, a request to decrypt the encrypted file;
      identify a classification of the encrypted file;
      based on identifying a first classification:
         obtain, using a first application programming interface (API) call to an employee hub, an employee hierarchy corresponding to the first user, wherein the employee hub comprises a computer system storing employee information including the employee hierarchy,
         compare the second user to the employee hierarchy, and
         based on identifying that the second user is included in the employee hierarchy:
            decrypt, using the symmetric key, the encrypted file, and
            grant access, to the second user, to the file; and
      based on identifying a second classification:
         obtain, using a second API call to the employee hub, personnel information indicating one or more employees within an authorized department of a company corresponding to the second classification, wherein the authorized department is automatically identified based on contents of the file, wherein a subset of the authorized department is further identified based on the contents of the file, and wherein the personnel information indicates the subset of the authorized department,
         compare the second user to the personnel information,
         based on identifying that the second user is included in the personnel information:
            decrypt, using the symmetric key, the encrypted file, and
            grant access, by the second user, to the file.

2. The computing platform of claim 1, wherein the memory stores additional computer-readable instructions that, when executed by the one or more processors, cause the computing platform to:
based on identifying that the first user is not included in the employee hierarchy:
deny access, to the second user, to the encrypted file, and
send, to the second user device, an error notification and one or more commands directing the second user device to display the error notification, wherein sending the one or more commands directing the second user device to display the error notification causes the second user device to display the error notification.

3. The computing platform of claim 1, wherein the first classification comprises a proprietary classification.

4. The computing platform of claim 1, wherein the memory stores additional computer-readable instructions that, when executed by the one or more processors, cause the computing platform to:
based on identifying that the first user is not included in the personnel information:
deny access, by the second user, to the encrypted file, and
send, to the second user device, an error notification and one or more commands directing the second user device to display the error notification, wherein sending the one or more commands directing the second user device to display the error notification causes the second user device to display the error notification.

5. The computing platform of claim 1, wherein the second classification comprises a company related classification.

6. The computing platform of claim 1, wherein the memory stores additional computer-readable instructions that, when executed by the one or more processors, cause the computing platform to:
based on identifying a second classification:
compare the second user to the first user, and
based on identifying that the second user is different than the first user:
deny access, by the second user, to the encrypted file, and
send, to the second user device, an error notification and one or more commands directing the second user device to display the error notification, wherein sending the one or more commands directing the second user device to display the error notification causes the second user device to display the error notification.

7. The computing platform of claim 6, wherein the second classification comprises a personal classification.

8. The computing platform of claim 1, wherein the memory stores additional computer-readable instructions that, when executed by the one or more processors, cause the computing platform to:
receive, from the first user device, a second request to decrypt the encrypted file; and
based on validating an identity of the first user:
decrypt, using the symmetric key, the encrypted file, and
grant access, to the first user, to the file.

9. The computing platform of claim 1, wherein the symmetric key is stored in a hardware security module (HSM) of the computing platform, and wherein the computing platform is configured with a unique protocol to access the HSM.

10. The computing platform of claim 1, wherein identifying the classification of the encrypted file comprises identifying, based on classification information included in the request to encrypt the file.

11. The computing platform of claim 1, wherein identifying the classification of the encrypted file comprises automatically identifying, based on contents of the file, the classification.

12. The computing platform of claim 1, wherein the symmetric key is unique to the first user.

13. The computing platform of claim 1, wherein enterprise access permissions for the first user are revoked, and wherein the revocation occurs:
after encrypting the file using the symmetric key, and
before receiving the request to decrypt the encrypted file.

14. The computing platform of claim 1, wherein the symmetric key is specific to the classification of the encrypted file.

15. The computing platform of claim 1, wherein the symmetric key is useable to validate only the first user until departure of the first user from an enterprise associated with the encrypted file, and wherein the symmetric key becomes useable to validate the second user upon a confirmation of the departure of the first user.

16. The computing platform of claim 1, wherein identifying the classification of the encrypted file comprises using one or more of: natural language processing (NLP), natural language understanding (NLU), or machine learning to identify the classification of the encrypted file.

17. The computing platform of claim 16, wherein identifying the classification of the encrypted file comprises:
receiving, from the first user, an initial classification;
analyze, using one or more of: the NLP, the NLU, or the machine learning, the encrypted file to validate the initial classification; and
based on detecting that the initial classification is invalid through the analysis, replacing the initial classification with the classification of the encrypted file.

18. A method comprising:
at a computing device comprising at least one processor, a communication interface, and memory:
receiving, from a first user device of a first user, a request to encrypt a file;
generating, for the file, a symmetric key;
encrypting, using the symmetric key, the file to produce an encrypted file;
receiving, from a second user device of a second user, a request to decrypt the encrypted file;
identifying a classification of the encrypted file;
based on identifying a first classification:
obtaining, using a first application programming interface (API) call to an employee hub, an employee hierarchy corresponding to the first user, wherein the employee hub comprises a computer system storing employee information including the employee hierarchy,
comparing the second user to the employee hierarchy, and
based on identifying that the second user is included in the employee hierarchy:
decrypting, using the symmetric key, the encrypted file, and
granting access, to the second user, to the file; and
based on identifying a second classification:

obtaining, using a second API call to the employee hub, personnel information indicating one or more employees within an authorized department of a company corresponding to the second classification, wherein the authorized department is automatically identified based on contents of the file, wherein a subset of the authorized department is further identified based on the contents of the file, and wherein the personnel information indicates the subset of the authorized department, comparing the second user to the personnel information, and based on identifying that the second user is included in the personnel information:

decrypting, using the symmetric key, the encrypted file, and granting access, by the second user, to the file.

19. The method of claim 18, further comprising:

based on identifying that the first user is not included in the employee hierarchy:

denying access, to the second user, to the encrypted file, and sending, to the second user device, an error notification and one or more commands directing the second user device to display the error notification, wherein sending the one or more commands directing the second user device to display the error notification causes the second user device to display the error notification.

20. One or more non-transitory computer-readable media storing instructions that, when executed by a computing device comprising at least one processor, a communication interface, and memory, cause the computing device to:

receive, from a first user device of a first user, a request to encrypt a file;

generate, for the file, a symmetric key;

encrypt, using the symmetric key, the file to produce an encrypted file;

receive, from a second user device of a second user, a request to decrypt the encrypted file;

identify a classification of the encrypted file;

based on identifying a first classification:

obtain, using a first application programming interface (API) call to an employee hub, an employee hierarchy corresponding to the first user, wherein the employee hub comprises a computer system storing employee information including the employee hierarchy, compare the second user to the employee hierarchy, and based on identifying that the second user is included in the employee hierarchy:

decrypt, using the symmetric key, the encrypted file, and grant access, to the second user, to the file; and based on identifying a second classification:

obtain, using a second API call to the employee hub, personnel information indicating one or more employees within an authorized department of a company corresponding to the second classification, wherein the authorized department is automatically identified based on contents of the file, wherein a subset of the authorized department is further identified based on the contents of the file, and wherein the personnel information indicates the subset of the authorized department, compare the second user to the personnel information, based on identifying that the second user is included in the personnel information:

decrypt, using the symmetric key, the encrypted file, and grant access, by the second user, to the file.

\* \* \* \* \*